March 18, 1941.  G. SLAYTER ET AL  2,234,986
MECHANICALLY DRAWING FIBERS
Filed Oct. 13, 1936
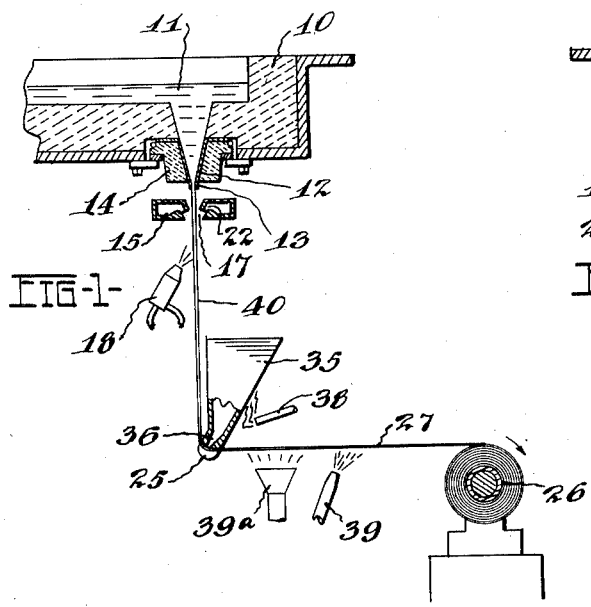
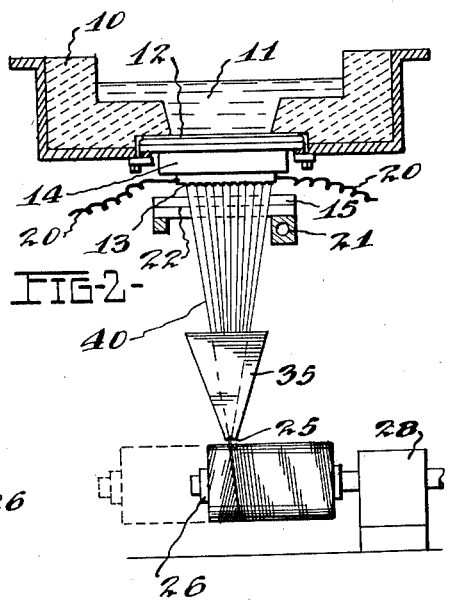
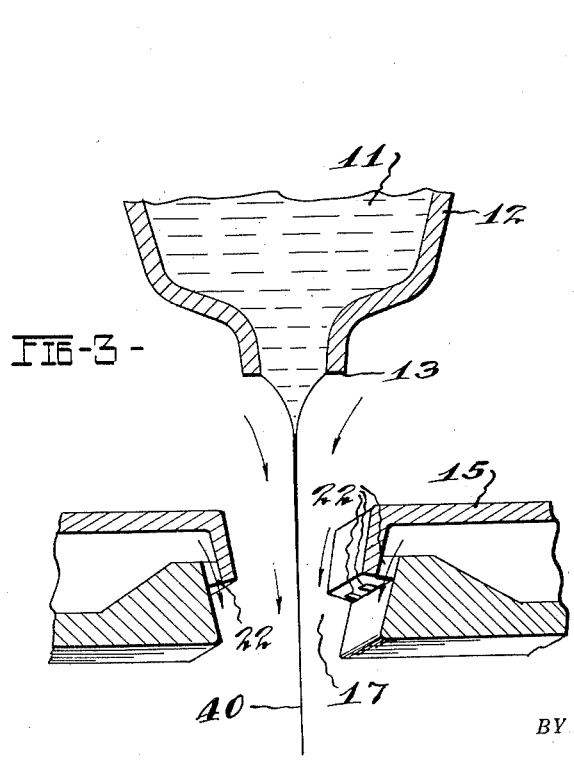
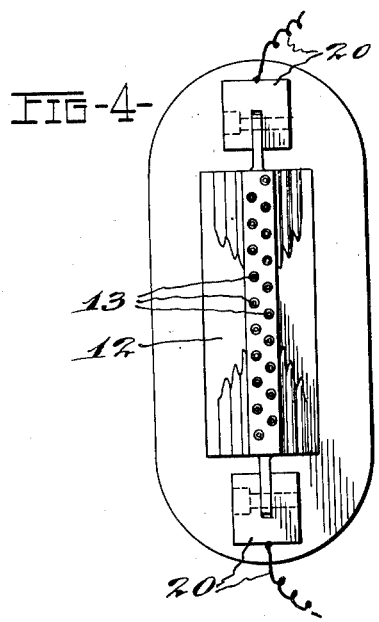
INVENTORS
James Slayter & J. H. Thomas.
BY
Rule & Hoge
ATTORNEYS Patented Mar. 18, 1941

2,234,986

UNITED STATES PATENT OFFICE 2,234,986

MECHANICALLY DRAWING FIBERS

Games Slayter and John H. Thomas, Newark, Ohio, assignors, by mesne assignments, to Owens-Corning Fiberglas Corporation, Toledo, Ohio, a corporation of Delaware Application October 13, 1936, Serial No. 105,405

22 Claims. (Cl. 49—17)

The present invention relates in part to a method and apparatus for making siliceous fibers, and more particularly to a novel method and apparatus for forming fibers by mechanical drawing of glass or the like to form relatively continuous threads of siliceous fibers. This application is a continuation in part of our copending application Serial No. 704,028, filed December 26, 1933, which issued October 11, 1938 as Patent No. 2,133,236.

We have discovered that individual fibers of glass, when drawn by our novel method, hereinafter particularly set forth, to an exceedingly small diameter as, for example, a few microns or smaller, have a very high tensile strength, are far more flexible and stretchable, and are greatly superior to those produced by methods heretofore in use. By our novel method we have produced glass fibers of greatly increased tensile strength, reaching 350,000 pounds or more per square inch. The ultimate strength of these fibers is probably limited by the mutual attraction of the molecules. Some glass fibers of the fineness which may be produced by the present method, have been measured and found to form a million to two million pounds per square inch tensile strength.

The flexibility of our glass filaments is another extremely important feature. Heretofore it has been practically impossible to weave threads of glass fibers through a conventional loom, and any cloths made of glass fibers could not stand flexing or wearing. Our method, however, produces continuous filaments which may be put through a loom to be woven into a flexible pliable piece of cloth. The flexibility of these filaments is one of the important advantages in making such yarns, fabrics and cloths possible. One of the reasons for the great increase in flexibility is the fact that the flexibility increases inversely as the cube of the diameter. Other factors also contribute to increase the flexibility of our filaments or fibers, such as the temperature of melting, attenuation and cooling of the glass and the consequent perfection of the filaments.

Not only are our fibers extremely flexible but they have also been found to be stretchable to a degree unheard of in prior fibers made of like material. As a matter of fact, our glass filaments have been found to be extensible as high as four or five percent and in some instances have been measured as high as about nine percent. For glass to be stretched to this degree is phenomenal. Methods which have heretofore been used in the mechanical drawing of glass fibers, have generally produced comparatively brittle, coarse and relatively rough fibers. A method heretofore in use for producing glass fibers by mechanical drawing consists in drawing a drop of molten glass from a ceramic refractory bushing having a relatively large orifice. When a relatively large orifice or gob is used from which to draw the fibers, the amount of reduction in diameter necessary to produce satisfactory fibers is excessively high. In other words, the ratio between the original diameter and the final diameter was so high that if attempts were made to produce fine fibers, the fibers would break at the point of pull. Thus, as the original outlet from the supply body had a large cross-sectional area, the limited amount of reduction would not permit the glass to be drawn to very fine fibers. Attenuation took place simultaneously over a large portion of the length of the strand and took place throughout a low temperature range.

In these prior methods, when drawing or stretching the fibers gradually at temperatures in the softening range, the fibers were internally stressed and weakened. The weakness and coarseness of the prior fibers, we believe, was due in a considerable measure to wrong temperatures and poor temperature control. As the glass gradually cooled through the softening range, the outer surface chilled first while the inner core remained more fluid or plastic. Then, as the outer surface tended to solidify and become viscous, it tended to withstand the pulling action. A point of solidification was finally reached at which the outer shell was so cool that it could not withstand further attenuation without rupture. The inner core being still soft, continued to attenuate, however, and the outer shell tended to pull apart and produce discontinuities or cracks. The discontinuities thus formed by the attenuation through the softening range materially weakened the fibers. The production of discontinuities is increased when the attenuation takes place simultaneously over a large portion of the length of the fiber. For these and other reasons, the fibers heretofore produced and the methods used in their production had serious disadvantages which we aim to overcome. In our method of drawing glass to fine fibers, we have successfully overcome the limitations and shortcomings of the prior art and have produced a new type of fine, continuous glass fibers having extremely high tensile strength, flexibility, extensibility and other new and beneficial characteristics.

It is an object of the present invention to provide an improved method and apparatus for producing glass fibers which are substantially continuous in length and which are exceedingly fine. Fibers and threads may be produced having lengths of many miles without discontinuity and having regulable diameter size as small or smaller than a few microns. As a matter of fact, by regulating conditions properly, any desired size of fiber within reasonable limits may be procured.

It is also an aim of the present invention to form a multiplicity of these fine fibers within a comparatively small space, thus facilitating adequate and accurate temperature control in their production.

It is also an object of the present invention to provide a method for applying a sizing or coating such as oil, wax, cellulose derivatives, rubber, resins, starches, gums, fats, fatty acids or other suitable substance to these fibers as they are being formed or shortly thereafter. Discontinuities, scratches, fissures or sharp points in the surface of the fiber define points for the concentration of stresses. When a thread of these fibers is pulled or bent, the induced stresses tend to concentrate at the discontinuities or fissures so that the thread or fibers break before their normal tensile strength is reached.

We have found that by the application of a sizing over the entire fiber, these fissures and discontinuities may be healed to a large extent. The sizing impregnates the discontinuities and permits the valleys and sharp projections to be leveled off. We have discovered that the tensile strength of fibers may thus be increased as much as double or triple their original value. It is believed that the surface tension of the coating or sizing reduces the concentration of stresses and supports the fibers.

The application of a sizing or coating performs a further function in the case of a thread formed of a plurality of fibers. The coating material forms a protective coating around each fiber, preventing adjacent fibers from touching each other. This is important in the case of glass fibers which normally tend to seize and scratch each other when bare. By coating shortly after the individual formation of the fibers, continuous pulling is facilitated.

It is a further object of the present invention to provide a method and apparatus which facilitate a high degree of temperature control for producing fibrous glass. In order to produce exceedingly small fibers at a rapid rate, it is necessary to have an accurate temperature control of the glass during its passage from the supply body of molten glass to the point at which said fibers may be said to be completely formed. When glass fibers are drawn from a supply body or from a stream having too low a temperature, the surfaces of the ultimate fibers tend to be rough and coarse. These fibers have been found to have numerous discontinuities, fissures, sharp points and the like over their surface at which stresses are concentrated and prematurely rupture the fibers. In drawing fibers the supply body should be fluid so that the glass may be made to flow smoothly and uniformly into fibrous form.

We have found that in the production of fibers having fine diameters it is important to have a uniformity in glass composition. All striae, cords or orientations of ingredients should be eliminated. By raising the temperature of the supply body, the intermixture and more complete solution of the ingredients are facilitated. At lower temperatures, below the melting range, the ingredients are hampered from thoroughly intermixing, and at these lower temperatures devitrification of the glass rapidly proceeds. Thus, the maintenance of a high temperature and adequate temperature control are a necessity not only in drawing the fibers, but also in production of the supply body.

The temperature control is also a necessity in maintaining the proper resistance for the attenuation of the fibers. After the glass has been reduced to the proper size in the form of a fiber, it is essential that it is sufficiently cool and viscous so that it will not continue to attenuate and pull to nothing. If the glass is too molten or fluid at this stage, it will not have sufficient strength or resistance to maintain this diameter. In high speed production of fibers, the temperature control from the supply body to the finished fiber must therefore be accurate.

In addition, without adequate temperature control, the attenuation may take place simultaneously over a long portion of its length. It has been found that if the attenuation does not take place simultaneously over a long distance, it is considerably more difficult to regulate the final size of the fiber. Not only will it be difficult to regulate the final diameter size of the fibers, but the attenuation may not be uniform throughout the length of the fiber. Thick and thin spots and other irregularities may thus be present. Moreover, as brought out hereinabove, attenuation over a long range produces a fiber having a multiplicity of minute strains, checks, and discontinuities, particularly at the surface.

In the mechanical drawing of fibers, it has heretofore been customary to employ refractory bushings of various ceramic materials. The size of the openings in these refractory bushings were relatively large and incapable of maintaining an accurate size. During the life of the refractory bushing, which was relatively short, the orifice opening gradually enlarged still further. The ceramic material, of which these refractory bushings were composed, did not have the property of being wetted by the molten glass. On the contrary, the issuing glass tended to recede from the orifice tip. For this reason it was difficult to regulate the cross-sectional size of the molten glass which was exposed to the atmosphere, and the glass fibers which were spun from these orifices were coarse, rough, and weak. Discontinuities and irregularities marred the outer surface of the glass.

Furthermore, in the use of ordinary ceramic refractories for bushings, the orifice openings which introduced the molten glass to the atmosphere were relatively rounded so that they did not have a definite edge from which the molten glass was drawn. This curvature became relatively more pronounced as the orifice size was decreased and by the use of ceramic refractories the fineness of the orifice openings was definitely limited. Moreover, in using ceramic refractories, it was difficult, if not impossible, to maintain an accurate temperature control at the desired portions of the refractory. In view of the low thermal conductivity of ceramic material, a close or accurate temperature control was practically impossible. As a matter of fact, so far as we are aware, no definite temperature control had been deemed necessary nor was it contemplated. For these reasons, the conventional spun glass was coarse, rough and weak.

It is an object of the present invention to provide a novel bushing for the production of drawn glass made of a material which may be accurately fashioned, particularly in regard to the size and dimensions of the orifice openings, and which, moreover, is composed of a material which has the property of being wetted by molten glass and thus may be made to expose to the atmosphere a definite cross-sectional area of molten glass at high temperature.

It is also an aim of the present invention to provide a bushing having a multiplicity of orifice openings which are individually small and, as a group, are located within a relatively small space. The arrangement of these orifice openings is designed to produce a maximum number of fibers simultaneously within the small space and insure an accurate temperature control for these orifice openings.

Other objects and advantages of the present invention will become apparent from the following description taken in conjunction with the drawing, in which:

Fig. 1 is a diagrammatic side elevational view of an embodiment of the present invention, showing the furnace and cooling means in section and means for coating the fibers.

Fig. 2 is a front elevational view of the embodiment shown in Fig. 1;

Fig. 3 is an enlarged cross-sectional view of a nipple and cooling means showing the fiber during its formation; and Fig. 4 is a bottom view of an improved thimble showing our novel arrangement of orifice openings.

Referring more particularly to Figs. 1 and 2, reference character 10 represents a glass furnace or melter in which a supply body 11 of molten glass is contained. In the floor of the furnace 10 is a metal bushing or thimble 12 which is provided with a series of nipples 13.

In order to produce exceedingly fine fibers we have found it desirable to start drawing from a relatively small cross-sectional area of exposed molten glass. For example, successful attenuation has been achieved from nipples which were in a range of .02" to .08" in diameter, these figures being subject to variation in accordance with particular degrees of attenuation, etc. desired. A diameter of about .04" has been found preferable for certain types of attenuation and, as a matter of fact, nipples of this diameter may be made to yield fibers having diameters of wide variation, according to the viscosity of the glass and the rate of drawing.

The thimble 12 is preferably composed of a 90—10 platinum-rhodium alloy. This material may be wetted by molten glass so as to expose definite amounts of the supply body. Other high temperature refractory metals or alloys capable of withstanding temperatures above or near the devitrification point of the particular glass contained therein, may also be used if desired. Around the thimble 12 is a refractory bushing 14 capable of supporting and insulating said thimble. The nipples 13 preferably project slightly below the thimble 12 and also below the refractory bushing 14.

Referring to Fig. 4, a novel arrangement for orifice openings is disclosed in which the nipples 13 are arranged in a plurality of rows and in staggered relation. In this manner a multiplicity of orifices are provided in close proximity to one another which facilitates the control of the temperature conditions at the orifice. In addition, by providing a bushing having plural rows of nipples, the rate of production from a single bushing is markedly increased. Since, with this arrangement it is possible to draw a greater number of fibers from approximately the same space usually allotted to a single row of orifices, a commensurate saving in fuel consumption and equipment and increase in production are effected. Furthermore, the thread formed from a single bushing may be composed of a greater number of fibers.

Spaced below the nipples a short distance is a cooling means or blower 15. The space between the refractory bushing 14 and the blower 15 is preferably open and unobstructed to permit cooling wind to be induced over the top of the blower, and down through the slot 17 separating the two halves of the blower. A device 18 for applying a sizing or coating material to the fibers and which may be mounted in proximity to the blower 15, is adapted to project such material in the form of a liquid or vapor onto the fibers as they are being formed. In Fig. 1 this coating device is shown in the form of a spray gun although other means such as are more fully described hereinafter may be and preferably are employed for this purpose.

Connected to opposite ends of the thimble 12 are electrical conductors 20 through which an adjustable current of electricity is supplied to regularly heat or melt the glass within the thimble. It is possible to effect all the heating and melting within the thimble 12 and so eliminate the conventional ceramic furnace 10. In this event preformed glass or cullet is preferably inserted in the thimble to be melted and fed to the nipples although this has not been found absolutely necessary. The blower 15 has an adjustable conduit 21 through which air or other fluid under pressure is admitted. Downwardly pointing jets 22 spaced along the inner sides of the blower divert the fluid toward the fibers to aid in cooling and regulating the temperature of the fibers as they are being formed. The cooling action may be accomplished in several ways, one of which is by the direct impingement of the blast along the fibers themselves, and another by the induction of cool air which is drawn inward and downward through the slot 17, in contact with the fibers. Various fluids may be used to chill the glass streams as, for example, air, steam, water or the like, and it is possible to direct the blast at various angles to the direction of the fibers although the angles shown have been found preferable. The induced air or other fluid may cool not only the fibers themselves, but also may impinge upon and cool the tips of the nipples to a certain extent and the exposed glass at the nipple tips. The gas pressure in the blower and the force of the gas which impinges on the fibers may be and is preferably made sufficiently high to aid somewhat in the drawing action on the fibers. This keeps the glass moving slowly and the openings clean when the operation has been stopped for any reason.

Mounted below the blower is an eye or guide 25 through which a multiplicity of fibers emerging from the thimble 12 are drawn. A pulling means, shown in the form of a cylindrical drum 26 is provided to mechanically draw the fibers and wind up the thread as it is being formed. The grouped fibers, after having passed through the guide 25, may be in parallel and close relationship, forming the thread 27, which is wound on the drum 26 at high speed. In order to wind the thread uniformly over the drum, the former is preferably reciprocated relatively to the drum. This may be accomplished in several ways as, for example, by reciprocating means 28 associated with the drum, or by reciprocating the thread by means of a reciprocating eye to guide the thread, as one skilled in the art would understand.

Arranged preferably in conjunction with the guide 25 is a sizing applying means 35 which is adapted to coat the individual fibers with a coating or sizing substance. The applying means 35 comprises a container having an opening 36 adapted to feed and keep wet the guide 25. A suitable sizing such as an oil, wax, cellulose derivative, rubber, resin, starch, gum, fat, fatty acid, or other coating substance, or an emulsion of a suitable substance, may be applied by the applying means 35. A burner 38 or other heating means may be provided to maintain the sizing at a predetermined temperature suitable for applying the sizing. This is advantageous when applying a thermoplastic sizing such as wax or the like. It has been found that a sizing or coating for the fibers forms a protection for the surface. The coating substance prevents adjacent fibers from scratching or seizing one another, and also tends to heal any discontinuities. In this way the inherent strength of the glass is more completely utilized and retained.

In order to dry or remove the excess sizing which may be applied by the liquid applying means 35, air jets 39 or other drying means are provided to direct a drying blast of air or other gas along the thread 27. A burner 39ª may also be provided for this purpose if desired. If a wax in liquid form is applied to the thread by the liquid applying means 35 and the wax is not sufficiently solidified before winding on the drum 26, the wax on the thread may tend to conflow with the wax already on the drum. This confluence and solidification of the wax on the drum makes it considerably more difficult, if not impossible, to unwind the thread from the drum. The heating means or burner 39ª also tends to soften the sizing and enables it to flow uniformly around the individual fibers and to thoroughly impregnate the thread.

By the present arrangement we have achieved a regulable method of temperature control for drawing the fibers which is very important. In order to procure strong, smooth fibers as small as and less than a few microns or thereabouts, a sufficiently high temperature is required to result in complete solution of the ingredients of the glass. For ordinary glass batches, heating above the melting or devitrification point is desirable. This desired high temperature may be in the neighborhood of about 2300° F. to 2800° F., more or less within rather wide limits of several hundred degrees, according to the particular glass used. At this high temperature we have found the glass uniform in composition and suitably fluid for our operation.

In attenuating the fibers, whether the glass has been produced from cullet or from glass batch, it has been found desirable to pull the glass from a relatively high temperature, ordinary lime glasses, for example, being preferably pulled from a temperature of about 2100° F. to 2500° F., although this range is also subject to variation in accordance with the type of glass used. Lead glass, in general, requires a lower temperature. The object sought after is to get the ingredients in as complete solution as possible and then pull the glass from a low viscosity at which the glass will readily flow and be attenuated into a fine fiber.

As the glass emerges from the nipple and is reduced to a small diameter, rapid cooling is required. The blower 15, having relatively low pressures of cool fluid therein, is used partially to induce cool atmospheric air over the top thereof and through the slot 17. The induced cooling air cools the lower extremities of the nipples 13 and also passes along the exposed surface of the glass.

By referring to Fig. 3, showing an enlarged view of the nipple and the cooling means, it will be noted that the fiber 40 is substantially formed and solidified by the time it has reached the level of the blower 15. This may be a very small distance as, for example, a small fraction of an inch. In any event, by the present method it is possible to draw the fibers directly from the exposed portion of the supply body without gradually reducing their size over a great length after they have left the supply body.

Over a long range of pulling it is in general more difficult, if not impossible, to secure an adequate temperature control, particularly in view of the exceedingly high speeds of formation. Thus, if the attenuation occurred simultaneously over a considerable length of the fiber, the pulling might be uneven and irregular. The hotter portions of the stream would tend to stretch out and break during their formation and thus yield poor quality fibers or actually stop production. The rapid cooling thus permits the glass to be hardened and frozen into desired form in close proximity to the orifice.

The speed of drawing, which may be varied within wide limits, say from a few hundred to a few thousand feet per minute, also affects the ultimate diameter size of the fibers. The diameter varies inversely with the speed of drawing, the relation being such that the rate of production of glass fibers in pounds per unit time is substantially constant at a particular temperature. The latter relationship does not always hold true, however, since under certain conditions, particularly lower temperatures, a higher speed of pulling may actually pull a greater amount of glass from the nipple opening, resulting in coarser, rather than finer fibers. At higher temperatures, however, the relationship is more nearly approximated.

Although the present invention has been illustrated and described in connection with specific embodiments, it is to be understood that variations and modifications may be resorted to which are within the scope and spirit of the invention as defined in the appended claims.

We claim:

1. The method of forming siliceous fibers, which comprises establishing a molten supply body of thermoplastic siliceous material, exposing said molten material to the atmosphere through a small orifice the walls of which are composed of metal and having a diameter size less than about .08 inch, drawing a fine fiber from said exposed portion by pulling said fiber mechanically and directing a cooling gaseous draft over the outlet end of said orifice and onto said exposed portion of siliceous material at said orifice to increase its viscosity.

2. The method of forming siliceous fibers, which comprises establishing a molten supply body of glass at a temperature near the devitrification point, exposing said molten material to the atmosphere through a small orifice composed of metal, the said orifice opening being between about .02 and .08 inch in diameter, drawing a fine fiber from said exposed portion by pulling said fiber mechanically, and directing a cooling gaseous draft over the outlet end of said orifice and onto said exposed portion of siliceous material at said orifice to increase its viscosity.

3. Apparatus for forming a substantially continuous, fine, glass fiber, which comprises a bushing having an orifice therein for molten glass, cooling means arranged in proximity to said orifice arranged to direct a draft of cooling gases over said orifice and the glass issuing from said orifice to rapidly cool the glass to solidification, and means for drawing a fiber from said orifice.

4. Apparatus for forming a substantially, continuous, fine, glass fiber, which comprises an electrically heated metal bushing having an orifice therein for the passage of molten glass, cooling means arranged in proximity to said orifice adapted to apply a draft of cooling gases over the molten glass exposed at said orifice to increase its viscosity prior to complete attenuation and to rapidly cool the glass to solidification after attenuation, and means for drawing a fiber from said orifice.

5. In combination, a metal bushing for feeding molten glass which comprises a downwardly converging trough having a plurality of orifices along the bottom thereof, said orifices being arranged in a plurality of rows, and the orifices of each of said rows being staggered with the orifices of adjacent rows, and a blower spaced away from said rows of orifices adapted to induce a draft of cooling gases against said orifices and the molten glass exposed thereat, said draft being applied to each side of said orifices substantially uniformly in order to produce uniform fine fibers.

6. In combination, a metal bushing for feeding molten glass which comprises a downwardly converging trough having a plurality of orifices along the bottom thereof, said orifices being arranged in a plurality of rows, and having diameters of less than .08 inch, and a blower spaced away from said rows of orifices adapted to induce a draft of cooling gases against said orifices and the molten glass exposed thereat, said draft being applied to each side of said orifices substantially uniformly in order to produce uniform fine fibers.

7. The method of forming substantially continuous, fine, glass fibers which comprises establishing a body of molten glass at a temperature above 2000° F., exposing a small area of said glass to the atmosphere through an orifice, pulling a fiber mechanically from said exposed surface, and rapidly cooling the glass by applying a draft of cooling fluid to the glass exposed at said orifice to increase its viscosity as it emerges from said molten body and forms into a fiber, said cooling being sufficiently rapid to harden said glass in close proximity to said orifice.

8. The method which comprises continuously flowing through outlet orifices, molten glass at a sufficiently high temperature and maintained at such a high temperature a sufficient length of time to cause a complete melting and solution of the glass and its ingredients, causing the flowing glass to contract to fine fibers, rapidly cooling the flowing glass by applying a draft of cooling fluid to the glass at the outlet ends of said orifices and during said contraction to increase the viscosity of said glass, and mechanically drawing and storing the fibers as they are formed.

9. The method which comprises liquefying a body of glass, exposing a small area of said glass at an outlet orifice formed of a material capable of being wetted by molten glass, causing a continuous flow of the glass from said area in the form of a fiber of many times small diameter than that of the outlet, and rapidly cooling by means of a draft of cooling gases the exposed surface of glass at the outlet end of said orifice and of the fiber as it flows away from the outlet until it has been transformed to a solid fiber.

10. The method which comprises liquefying a body of glass, exposing an area of said glass at the outlet orifice formed of a material capable of being wetted by molten glass, causing a continuous flow of the glass from said area in the form of a fiber of many times smaller diameter than that of the outlet, and applying a cooling medium to the exposed surface of glass at said orifice to increase its viscosity and thereby cooling the glass during its transition from a liquid to solid form with sufficient rapidity to prevent incipient crystallization or devitrification.

11. The method of forming siliceous fibers, which comprises establishing a molten supply body of thermoplastic siliceous material, flowing a portion of said body through a small orifice to expose a small portion of said body to the atmosphere at the outlet end of the orifice, artificially cooling said exposed portion by inducing a flow of gases at the outlet end of said orifice in order to increase the viscosity thereof, and mechanically drawing a fine fiber from said cooled exposed portion.

12. The method of forming glass fibers, which comprises establishing a molten supply body of glass in a container having a small outlet orifice, exposing a small portion of said supply body to the atmosphere through said orifice, applying a draft of cooling gases to said exposed portion of glass at said outlet end of said orifice in order to increase the viscosity thereof, and mechanically drawing a fine fiber from said cooled portion.

13. Apparatus for forming a substantially continuous fine glass fiber, which comprises a container for a molten supply body of glass, said container having a small outlet orifice therein, cooling means arranged in proximity to said orifice arranged to direct a draft of cooling gases over the glass exposed at and issuing from the outlet end of said orifice to increase the viscosity thereof, and means for mechanically drawing a fiber from said orifice.

14. The method which comprises maintaining a supply body of molten glass, causing a continuous flow of the glass from the supply body through an outlet orifice with the glass as it flows through the orifice at a sufficiently high temperature to maintain the glass and its ingredients in complete solution, causing issuing glass as it departs from the outlet to contract rapidly to the form of a fiber many times smaller in cross-section than the outlet, and applying a draft of cooling fluid over the entire surface of the issuing glass at the outlet end of said orifice and of the fiber as it flows away from the outlet until it has been transformed to a solid fiber.

15. The method of forming a glass fiber, which comprises establishing a molten supply body of glass, flowing a portion of said body through a small orifice to expose a small portion of said body to the atmosphere at the outlet end of said orifice, drawing a fine fiber from said exposed portion by pulling means spaced away from said orifice, directing a blast of cooling fluid against and along said fiber in the general direction of its movement in a zone intermediate said orifice and place of pulling, and causing surrounding gaseous medium to be induced over said orifice and against the glass issuing thereat to increase its viscosity.

16. The method of forming a glass fiber, which comprises establishing a molten supply body of glass, flowing a portion of said body through a small orifice to expose a small portion of said body at the outlet end of said orifice, drawing a fine fiber from said exposed portion by pulling the same from a region spaced away from said orifice, directing gaseous jets against said fiber from opposite sides thereof and in a direction to cause them to conflow and pass down along the said fiber in the general direction of movement thereof, and causing surrounding gaseous medium to be induced over the outlet end of said orifice from opposite sides thereof and along the glass emerging from said orifice and into the said jets.

17. The method of forming a fiber of thermoplastic material, which comprises establishing a molten supply body of thermoplastic material, flowing a portion of said body through a small orifice to expose a small portion of said body at the outlet end of said orifice, drawing a fine fiber from said exposed portion by pulling the same from a region spaced away from said orifice, directing gaseous jets from opposite sides of said fiber against said fiber and in a direction to cause them to conflow and pass down along the said fiber in the general direction of movement thereof, and causing surrounding gaseous medium to be induced over the outlet end of said orifice from opposite sides thereof and along the thermoplastic material emerging from said orifice and into the said jets.

18. The method of forming a glass fiber, which comprises establishing a molten supply body of glass, flowing downwardly a portion of said body through a small orifice at a low viscosity to expose a small portion of said body to the atmosphere at the outlet end of said orifice, drawing a fine fiber in a downward direction from said exposed portion by pulling the same from a region spaced away from said orifice, directing gaseous jets from opposite sides of said fiber against said fiber and in a direction to cause them to conflow and pass down along the said fiber in the general direction of movement thereof, and causing surrounding gaseous medium to be induced over the outlet end of said orifice from opposite sides thereof and along the glass flow emerging from said orifice and into the said jets.

19. Apparatus for forming a substantially continuous fine glass fiber, which comprises a container for a molten supply body of glass, said container having a small outlet orifice therein, means spaced away from said orifice for pulling a fiber of glass from said orifice, and a blower intermediate said pulling means and said orifice and spaced away from each, said blower being provided with jets arranged at opposite sides of said fiber adapted to direct blasts of gas against said fiber and in the general direction of movement of said fiber to cause gaseous medium surrounding said orifice to be induced into said blasts and pass over the surface of glass issuing at the outlet end of said orifice to increase the viscosity thereof.

20. Apparatus for forming a substantially continuous fine fiber of thermoplastic material, which comprises a container for a molten supply body of thermoplastic material, said container having a small outlet orifice therein, means spaced away from said orifice for pulling a fiber of thermoplastic material from said orifice, and a blower intermediate said pulling means and said orifice and spaced away from each, said blower being provided with jets arranged at opposite sides of said fiber adapted to direct blasts of gas against said fiber and in the general direction of movement of said fiber to cause gaseous medium surrounding said orifice to be induced into said blasts and pass over the surface of the thermoplastic material issuing at the outlet end of said orifice to increase the viscosity thereof.

21. The method of forming siliceous fibers, which comprises establishing a molten supply body of thermoplastic siliceous material, exposing said molten material to the atmosphere through a small orifice, the wall of which is composed of metal and having a diameter size less than about .08 inch, changing the viscosity of said supply body in proximity to said orifice to a sufficiently fluid stage to enable it to flow readily through said orifice, directing a cooling gaseous draft over the outlet end of said orifice and onto said exposed portion of siliceous material at said orifice to increase its viscosity to a degree to enable it to be attenuated to fibrous form, and drawing a fine fiber from said exposed portion by pulling said fiber mechanically.

22. The method of forming siliceous fibers, which comprises establishing a molten supply body of glass at a temperature above the devitrification point, exposing said molten material to the atmosphere through a small orifice, the wall of which is composed of metal, the said orifice opening being between about .02 and .08 inch in diameter, changing the viscosity of said supply body in proximity to said orifice to a sufficiently fluid stage to enable it to flow readily through said orifice, directing a gaseous draft of cooling gases over the outlet end of said orifice and onto said exposed portion of siliceous material at said orifice to increase its viscosity to a degree to enable it to be attenuated into fibrous form, and drawing a fine fiber from said exposed portion by pulling the fiber mechanically.

GAMES SLAYTER.
JOHN H. THOMAS.